United States Patent [19]

Kurata et al.

[11] Patent Number: 5,050,155
[45] Date of Patent: Sep. 17, 1991

[54] PICK-UP DEVICE FOR USE IN AN OPTICAL INFORMATION RECORDING SYSTEM UTILIZING A DIFFRACTION GRATING WITH BLAZE CHARACTERISTICS

[75] Inventors: Yukio Kurata; Hideaki Sato; Yasuo Nakata; Nobuo Ogata, all of Tenri, Japan

[73] Assignee: Sharp Kabushiki Kaisha, Osaka, Japan

[21] Appl. No.: 330,429

[22] Filed: Mar. 30, 1989

Related U.S. Application Data

[63] Continuation-in-part of Ser. No. 928,395, Nov. 10, 1986, Pat. No. 4,849,825.

[30] Foreign Application Priority Data

Nov. 11, 1985 [JP] Japan .................. 60-254483
Dec. 28, 1985 [JP] Japan .................. 60-285960

[51] Int. Cl.$^5$ .............................................. G11B 7/00
[52] U.S. Cl. ........................................ 369/112; 369/107; 369/44.14
[58] Field of Search ............... 350/3.61, 3.83, 96.19, 350/162.2, 96.18; 369/112, 109, 44.12, 44.14, 275.3, 107

[56] References Cited

U.S. PATENT DOCUMENTS

| | | |
|---|---|---|
| 3,680,945 | 8/1972 | Sheridon . |
| 3,876,841 | 4/1975 | Kramer .................. 369/118 X |
| 4,403,318 | 9/1963 | Nagashima et al. . |
| 4,484,072 | 11/1984 | Matsumura . |
| 4,624,526 | 11/1986 | Tsukai et al. . |
| 4,832,464 | 5/1989 | Kato et al. ............. 350/162.16 |
| 4,937,808 | 6/1990 | Shimada et al. ............ 369/112 |

FOREIGN PATENT DOCUMENTS

0147749 7/1985 European Pat. Off. .
3522849 1/1986 Fed. Rep. of Germany .

OTHER PUBLICATIONS

Published Japanese Abstract for Japanese Patent No. 60-182,526, vol. 10, No. 34 (P-427) (2091).

*Primary Examiner*—Robert L. Richardson

[57] ABSTRACT

A pick-up device which includes a light source and a condenser lens for effecting recording and reproduction of information by projecting a light beam as collected by the condenser lens onto a recording medium. A diffraction grating is provided between the light source and the condenser lens for dividing light returning from the recording medium by a diffraction grating so as to be directed to a photo-detector, to thereby obtain an optical detection signal.

12 Claims, 6 Drawing Sheets

PICK-UP DEVICE FOR USE IN AN OPTICAL INFORMATION RECORDING SYSTEM UTILIZING A DIFFRACTION GRATING WITH BLAZE CHARACTERISTICS

This application is a continuation-in-part of application Ser. No. 928,395, filed on Nov. 10, 1986, and now U.S. Pat. No. 4,849,825.

BACKGROUND OF THE INVENTION

The present invention generally relates to a pick-up arrangement and more particularly, to a pick-up device suitable for use in an optical disc apparatus such as a so-called compact disc player, video disc player or the like.

Commonly, an optical disc apparatus is arranged so as to accomplish recording by forming fine holes or grooves in a spiral or concentric pattern on the surface of a disc-like recording medium or by subjecting the surface of the recording medium to magnetic variations. To accomplish reproduction, a spot of light is projected onto the recorded portion of the recording medium so as to derive the reflected light or transmitted light as information reproduced from the recording medium.

Figure 1:
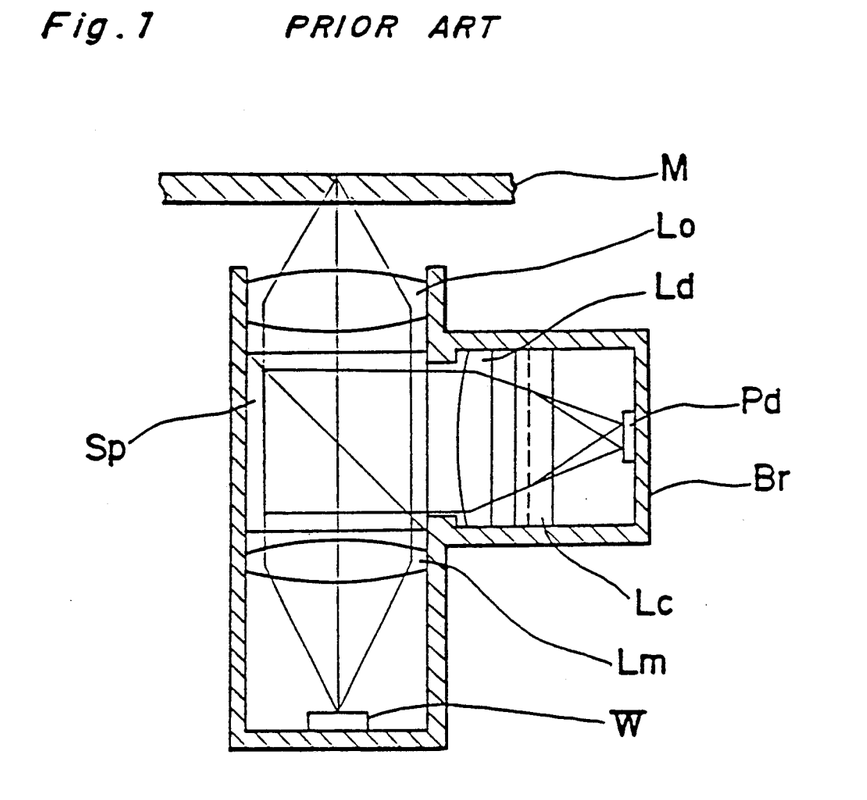
FIG. 1 is a schematic side sectional view showing a general construction of a conventional optical information reading pick-up device which may be incorporated in an optical disc apparatus.

In FIG. 1, there is shown a general construction of a conventional optical information reading pick-up device as incorporated in an optical disc apparatus.

In the conventional pick-up device, as shown in FIG. 1, the optical system includes a collimate lens Lm and a beam splitter Sp provided in a barrel Br so as to collect and project laser light emitted from a semi-conductor laser W onto a recording medium M through the collimate lens Lm, the beam splitter Sp and an objective lens Lo. After being subjected to modulation by the information recorded portion on the recording medium M, the light thus projected is divided by the beam splitter Sp through the objective lens Lo. One portion of the divided light is incident upon a photo-detector Pd via a detecting system convex lens Ld and a cylindrical lens Lc.

In the conventional optical information reading pick-up device having the optical system as described above, in order to correctly record the information on the recording medium or to accurately reproduce the recorded information from the recording medium, it is necessary to control the tracking process, in a manner, such that the collected light spot correctly traces the information portion (referred to as tracking) as recorded in the spiral or concentral configuration (i.e. information record track), while simultaneous controlling the focusing of the light spot.

Moreover, for actual application, since the above pick-up device is subjected to influences due to eccentricities or fluttering of the disc, and external vibrations, etc., it is necessary to provide a mechanism to derive such deviations as error signals for automatic correction. For this purpose, it has been a normal practice to accomplish the focus control and the tracking control through employment of an electromagnetic driving unit including a magnetic circuit and a coil means. For ensuring control within the high frequency region during the above tracking driving, it is desirable that the driving portion be compact in size and light in weight.

From the above point of view, it has also been proposed in a conventional arrangement that only the objective lens Lo be separated from the barrel for driving, However, in such a construction, deviation between an optical axis of the pick-up and that of the objective lens is realized, thus resulting in the deterioration of the quality of the pick-up control signal causing some countermeasures to be necessary. Furthermore, in order to avoid the deterioration of the recording signal and reproducing signal with respect to the disc, a driving unit having a sufficiently high accuracy is necessary so as to prevent inclination of the lens optical axis from taking place during driving of the objective lens.

Meanwhile, in the pick-up device, as shown in FIG. 1, when the whole pick-up assembly is driven, cross-talk between the tracking control and the focus control tends to take place since the barrel Br is not formed with axial symmetry. More specifically, on the assumption that the pick-up is driven in a direction at right angles with respect to the recorded surface of an information carrier or recording medium having a disk-like shape, a phenomenon where the optical axis deviates from the direction normal to the recorded surface, is difficult to avoid when a pick-up device is used which does not have axial symmetry.

Additionally, in the conventional pick-up device as shown in FIG. 1, the astigmatism producing optical system including the convex lens Ld and the cylindrical lens Lc is necessary to obtain the focusing error signal for accomplishing the focus control. However, such an optical system becomes an obstruction in realizing the reduction of size, weight and cost for the pick-up device.

SUMMARY OF THE INVENTION

Accordingly, an essential objective of the present invention is to provide an improved pick-up device for use in an optical disc apparatus or the like, which has a symmetrical construction, and is compact in size and light in weight, with a reduced number of parts involved, and which can be readily manufactured at low cost.

Another important objective of the present invention is to provide a pick-up device of the above described type, which is arranged to suppress the undesirable cross-talk phenomenon by imparting a blaze characteristic in a diffracting direction of a diffraction grating.

In accomplishing these and other objectives, according to one preferred embodiment of the present invention, there is provided a pick-up device which includes a light source and a condenser lens for accomplishing recording and reproduction of information by projecting a light beam as collected by the condenser lens onto a recording medium, which there is further provided a diffraction grating between the light source and the condenser lens for dividing light returning from the recording medium so that it is directed to a photo-detector, thereby obtaining an optical detection signal.

By the above arrangement of the present invention, an improved pick-up device has been advantageously provided, with substantial elimination of disadvantages inherent in the conventional pick-up devices of this kind.

BRIEF DESCRIPTION OF THE DRAWINGS

These and other objectives features of the present invention will become apparent from the following description taken in conjunction with the preferred embodiment of the present invention with reference to the accompanying drawings, in which.

DETAILED DESCRIPTION OF THE INVENTION

Before the description of the present invention proceeds, it is to be noted that like parts are designated by like reference numerals throughout the accompanying drawings.

Figure 2:
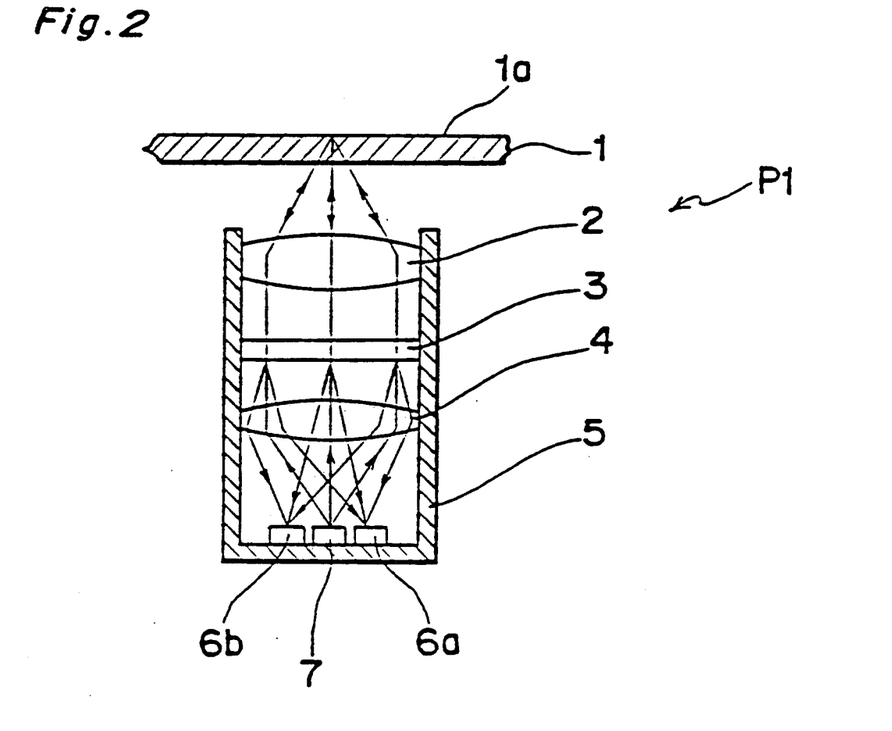
FIG. 2 is a schematic side sectional view showing construction of an improved optical information reading pick-up device according to one preferred embodiment of the present invention.

Referring now to the drawings, there is shown in FIG. 2, an improved pick-up device P1 according to one preferred embodiment of the present invention.

The pick-up device P1 in FIG. 2 generally includes a barrel 5 extending in a direction intersecting at right angles with a recording surface 1a of a recording carrier or medium 1, an objective lens 2, a diffraction grating 3, a collimate lens 4, and a semi-conductor laser or laser diode 7 provided between photo-detectors 6a and 6b sequentially disposed within the barrel 5 in the above order in a direction away from the recording medium 1.

In the pick-up device P1 as described above, after being subjected to collimation by the collimate lens 4, light emitted from the semi-conductor laser 7 is transmitted through the diffraction grating 3 and advances in a direction in which zero-order light intersects at right angles with the recording surface 1a of the recording medium 1. This light is subsequently collected by the condenser lens 2 for the purpose of being projected onto the recording surface 1a. The light thus projected is modulated at the recorded information portion on the recording medium 1, and after being collected by the objective lens 2, it is subjected to diffraction by the diffraction grating 3. The light is diffracted by the diffraction grating 3 and projected onto the detectors 6a and 6b by the collimate lens 4, and thus, it become possible to reproduce the information recorded on the recording medium 1.

As is seen from the above description, according to the arrangement of the present invention, it becomes possible not only to realize the symmetrical nature of the pick-up, but also to reduce the size, weight and cost for the pick-up device.

Subsequently, means for detecting a focusing error signal which may be incorporated in the arrangement of FIG. 2 will be described below.

Figure 3:
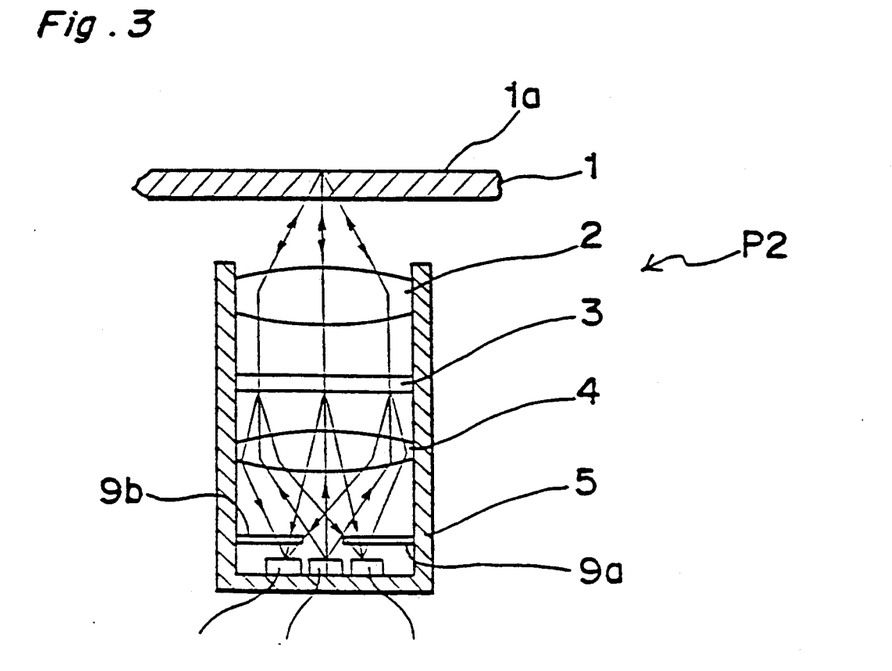
FIG. 3 is a view similar to FIG. 2, which particularly shows an arrangement in which cylindrical lenses are further included between a collimate lens and optical detectors for detection of a focusing error signal.
Figure 4:
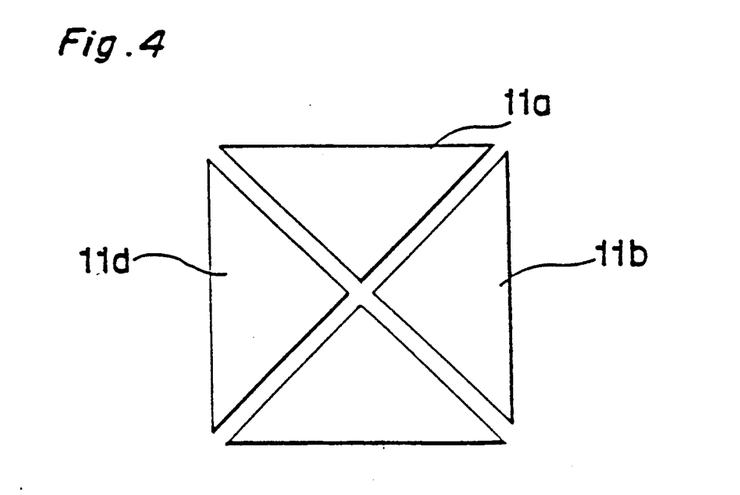
FIG. 4 is a top view of quartered photo-detecting elements to be employed in the arrangement of FIG. 2 as detectors.

Since the pick-up device P1 shown in FIG. 2 is compact in size and light in weight, detection of the focusing error signal can be readily accomplished by the so-called wobbling method. However, for the simplification of a pick-up control electronic circuit, it is desirable to optically obtain the focusing error signal. For this purpose, a pick-up device P2 in FIG. 3 may be used. In this device, cylindrical lenses 9a and 9b are disposed in a space between the collimate lens 4 and the photo-detectors 6a and 6b within the barrel 5. For a further simplification of the construction, the detectors 6a and 6b may be replaced by quartered photo-detectors 11a, 11b, 11c and 11d for astigmatism detection as illustrated in FIG. 4. These detectors positively utilize the astigmatism produced by the diffraction of the diffraction grating 3. Although not particularly shown, the arrangement may be further modified, for example by limiting the distance between the object point and image point of an objective lens to allow the elimination of the collimate lens 4 from the pick-up device, thereby utilizing light incident upon the diffraction grating 3 as focusing light. By such an arrangement, light diffracted in the direction of the detectors 6a and 6b in light having the characteristic of astigmatism, thus making it possible to accomplish the focusing error detection by the astigmatic method.

As is seen from the foregoing description, according to the present invention, the improved pick-up device having the symmetrical nature in the structure, and compact in size and light in weight may be realized through simple construction, and consequently, improvement in performance of the optical disc system employing such pick-up device can be achieved.

Figure 5:
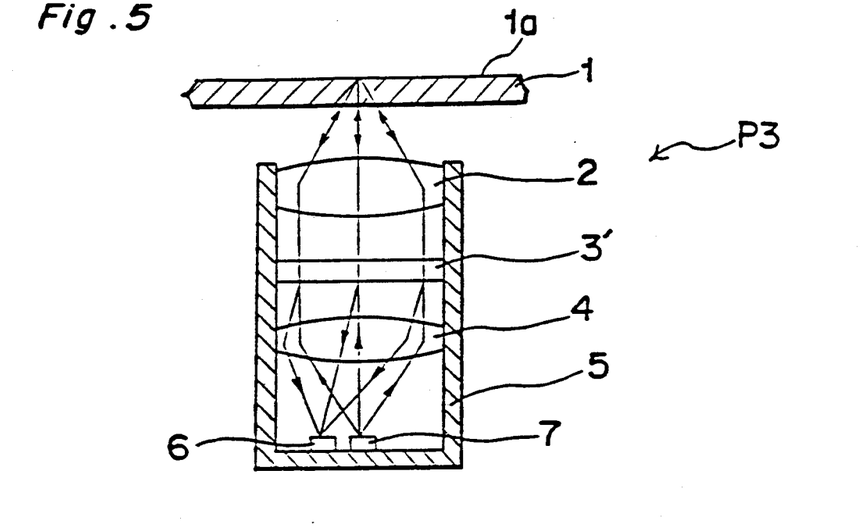
FIG. 5 is a view similar to FIG. 2, which particularly shows a modification thereof.
Figure 6:
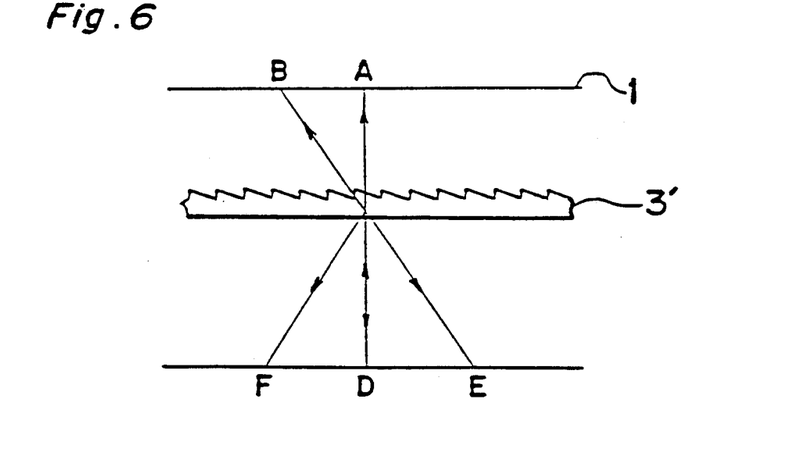
FIG. 6 is a diagram schematically showing construction of the pick-up device of FIG. 5 having a blaze characteristic.

Referring further to FIGS. 5 and 6, there is shown in FIG. 5 a modification of the pick-up device P1 of FIG. 2, while FIG. 6 shows a schematic diagram of the arrangement of FIG. 5. In the modified pick-up device P3 in FIG. 5, like parts in the pick-up device P1 in FIG. 2 are designated by like reference numerals for brevity of description.

Generally, in a similar manner as described for the arrangement of FIG. 2, the pick-up device P3 in FIG. 5 includes the barrel 5 extending in a direction intersecting the recording surface 1a of the recording medium 1 at right angles, the objective lens 2, diffraction grating 3', collimate lens 4, and semi conductor laser or laser diode 7 provided at one side of the detector 6 sequentially disposed within the barrel 5 in the above order in a direction away from the recording medium 1.

In the pick-up device P3 as described above, after being subjected to collimation by the collimate lens 4, the light emitted from the semi-conductor laser 7 is transmitted through the diffraction grating 3', and advances in a direction in which zero-order light intersects the recording surface 1a of the recording medium 1 at right angles. This light is subsequently collected by the condenser lens 2 for the purpose of being projected onto the recording surface 1a. The projected light thus projected is modulated by the recorded information portion on the recording medium 1, and collected by the objective lens 2. The light is then subjected to diffraction by the diffraction grating 3'. The diffracted light is projected onto the detector 6 by the collimate lens 4, and thus, it becomes possible to reproduce the information recorded on the recording medium 1.

It should be noted here that a major difference between the pick-up device P3 in FIG. 5 and the pick-up device P1 of FIG. 2 resides in the construction of the diffraction grating as described below.

More specifically, in the pick-up device P3, the diffraction grating is constructed so as to have a blaze characteristic, and FIG. 6 shows the construction of the diffraction grating 3′ provided with the blaze characteristic, and applicable to the arrangement of FIG. 5.

Figure 7:
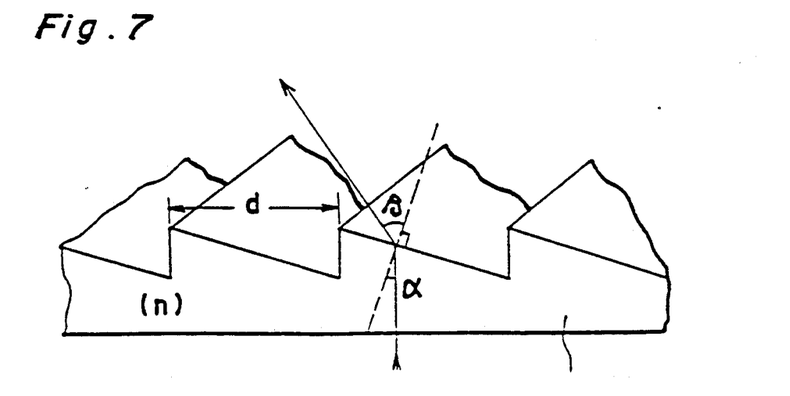
FIG. 7 is a fragmentary perspective view showing on an enlarged scale, part of the diffraction grating of FIG. 6.

As shown on an enlarged scale in FIG. 7, the diffraction grating 3′ in FIG. 6 has surface formed into a sawtooth shape. This shape is intended to cause the direction of the light refracted from the teeth to coincide with each other so as to blaze the light which has passed through the diffraction grating 3′, thereby to concentrate energy in a direction of the diffraction. For the above purpose, the shape is so determined as to satisfy a following equation on the assumption that light is vertically incident upon the flat face side of the diffraction grating 3′.

$$n * \sin(\alpha) = \sin(\beta) \tag{1}$$

$$d * \sin(\beta - \alpha) = Kw \tag{2}$$

where
- n: refractive index of the diffraction grating 3′
- $\alpha$: angle shown in FIG. 7
- $\beta$: angle shown in FIG. 7
- d: distance diffraction grating depth as shown in FIG. 7
- w: wavelength of light
- K: integral number By the employment of the diffraction grating 3′ as described above, as shown in FIG. 6, the light emitted from a point D where the semi-conductor laser 7 is disposed, is diffracted by the diffraction grating 3′ and forms light spots only at two points A and B on the recording medium 1. Of these two points, the reproducing signal by the light modulated at the point A of the recording medium 1 is the correct signal. The reflected light from point A is diffracted by the diffraction grating 3′, and reaches a point F for the detector 6 and the point D for the semi-conductor laser 7. Meanwhile, the light based on the returning light modulated at a point B (on the other track) slightly spaced from the correct spot A and not subjected to diffraction by the diffraction grating 3′ and reaches a point E away from the detector 6 and the point D where the semi-conductor laser 7 is disposed. Accordingly, only the returning light from the correct spot position A reaches the detector 6, and thus, an improved pick-up device free from influence of cross-talk and having favorable characteristics with a high efficiency for light utilization, may be realized.

In an optical pick-up device used exclusively for reproduction, the diffraction grating must be designed so that the light amount reaching the optical detector 6 in FIG. 5 becomes the maximum.

The zero order light transmission parameter, $Z_0$, and the primary light diffractive efficiency parameter, $Z_1$, of the blazed diffraction grating are represented by the equations as follows:

$$Z_0 = Y^{-2}(\sin Y)^2 \tag{3}$$

$$Z_1 = (Y - \pi)^{-2}(\sin Y)^2 \tag{4}$$

where
$Y = \pi(n_2 - n_1) * (d/w_0)$
d = Diffraction grating depth as shown in FIG. 7
$w_0$ = wave length of light source in vacuum, and $n_1$, $n_2$ = Refractive index of air and the grating medium, respectively.

If the reflectance of disc 1 is represented by R, the rate at which the light emitted by the light source reaches the optical detector, i.e., the light utilizing efficiency Z is represented by the product of $Z_0$ and $Z_1$, as in the following equation.

$$Z = R(Y - \pi)^{-2} * Y^{-2} * (\sin Y)^4 \tag{5}$$

Since Z takes the maximum value 0.164 when $Y = \pi/2$, d may be set so as to satisfy the equation, $$w_0/2 = (n_2 - n_1)d. \tag{6}$$

In the present invention, $n_1 = 1$, and therefore, $$w_0/2 = (n_2 - 1)d. \tag{7}$$

Since a large light amount becomes necessary on the recording medium during the recording and reproducing process, the device is normally designed so that the ratio between the amount of light reaching the disc and the amount of light reaching the photo detector becomes approximately equal to 15:1. This ratio is dependent upon the recording medium.

When $Z_0$ and $Z_1$ and the reflectance R of the disc as defined above are employed, the ratio between the amount of light reaching the disc and the amount reaching the optical detector may be represented as $Z_0:(Z_0 * Z_1 * R)$.

To make the relation equal to 15:1, $A_1$ may be determined to satisfy $$15R * Z_1 = 1.$$

Since the reflectance R for the recording and reproducing disc is generally in the relation $0.1 \leq R \leq 0.9$, $Z_1$ may be $0.074 \leq Z_1 \leq 0.667$.

Accordingly, Y may be in the relation as $0.71 \leq Y \leq 2.07$. Therefore, d is designed to satisfy $$0.226 \, w_0 \leq (n_2 - n_1)d \leq 0.66 \, w_0$$

However, in the case of the present invention, $n_1 = 1$, and therefore, $$0.226 \, w_0 \leq (n_2 - 1)d \leq 0.66 \, w_0.$$

Figure 8:
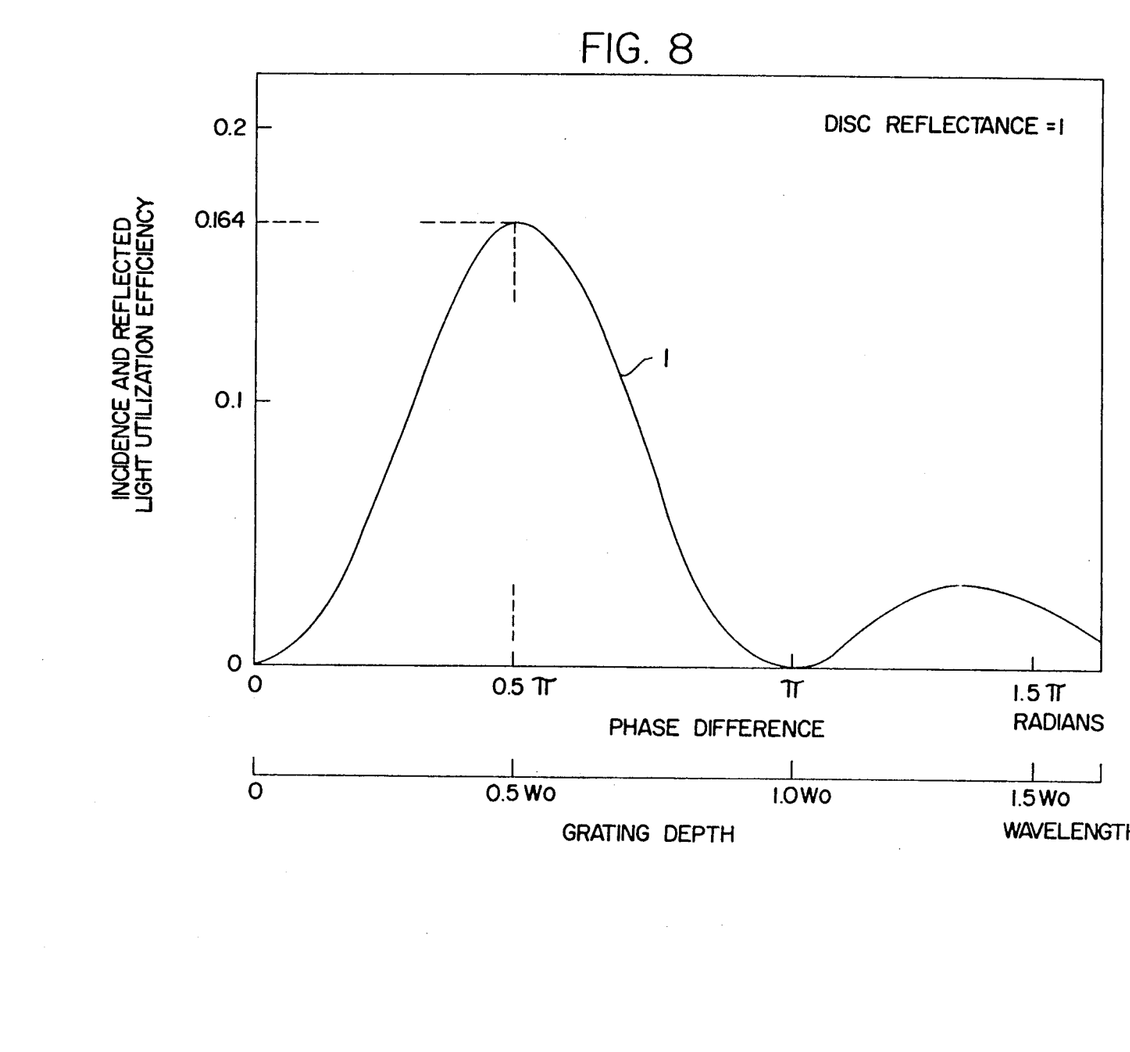
FIG. 8 shows a graph of the incidence and reflected light utilization efficiency.

In the case of exclusively for reproduction, on the assumption that the reflectance of the disc R = 1.0, the going and returning utilization efficiency of light Z is denoted by:

$$Z = R(Y - \pi)^{-2} * Y^{-2} * (\sin Y)^4 \tag{8}$$

as represented by a curve 1 in FIG. 8. Since the maximum value of Z is 0.164, the phase difference is 0.5 radians(rad). This phase difference is the equivalent to a grating depth of $0.5 \, w_0$.

Figure 9:
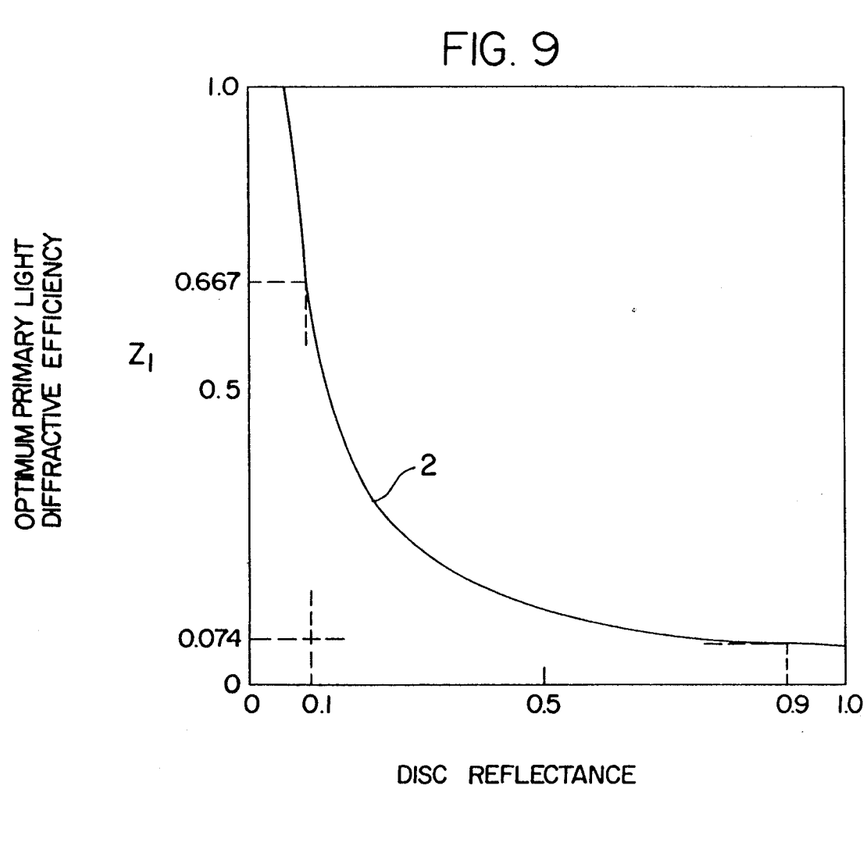
FIG. 9 shows a graph of the optimum primary light diffractive efficiency.
Figure 10:
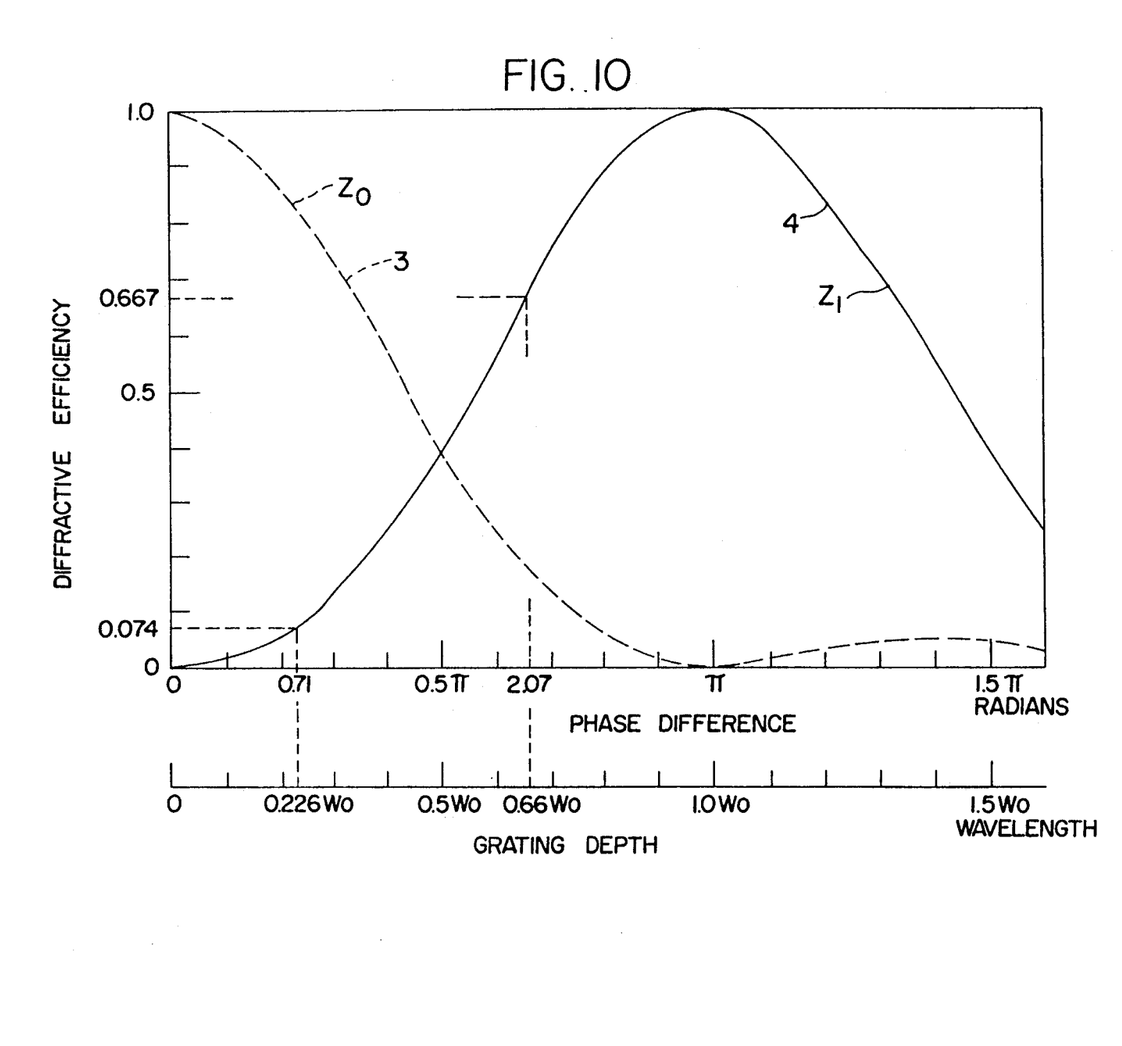
FIG. 10 shows a graph of the diffractive efficiency.

In the case of recording and reproduction, the curve 2 as shown in FIG. 9 shows the relation between the disc reflectance R and the optimum primary light diffractive efficiency $Z_1$. In FIG. 10, the curve 3 shows the relation between the diffractive efficiency $Z_0$ and the phase difference, while the curve 4 denotes the relation between the diffractive efficiency $Z_1$ and the phase difference. From the curves 3 and 4, it is seen that the phase difference should preferably be in the range, $0.71 \leq Y \leq 2.07$. From the above result, the following relationship will be satisfied:

$$0.226\, w_0 \leq (n_2 - n_1)d \leq 0.66\, w_0.$$

The above equation for the range of the grating depth in the case for the recording and reproduction covers the grating depth $0.5\, w_0$ in the case of exclusively for reproduction.

As is clear from the foregoing description, according to the present invention, it is possible to produce a high performance pick-up device having a symmetrical nature, which is compact in size and light in weight.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as being included therein.

What is claimed:

1. In an optical information storage system for reproducing information stored on a recording medium which modulates a light beam projected thereon, a pick-up device comprising:

light source means for directing light having a certain wavelength $w_0$, along a primary axis to the recording medium;

photo-detector means, disposed adjacent said light source means, for reading information from the recording medium; and diffraction grating means, having a depth, d, and indices of refraction, $n_1$ and $n_2$, being disposed between the recording medium and said photo-detector means and having a blaze characteristic, for directing said light from said light source means along said primary axis to a desired portion of the recording medium and along a secondary direction to an undesired portion of the recording medium, said blaze characteristic satisfying a relation where $0.2*w_0 \leq (n_2 - n_1)*d \leq 0.7*w_0$;

said diffraction grating means directing light modulated by said desired portion to said photo-detector means to provide information to said photo-detector means while passing light reflected from said undesired portion away from said photo-detector means.

2. The pick-up device as claimed in claim 1, further comprising:

cylindrical lens means, disposed between said diffraction grating means and said photo-detector means, for providing a focusing error signal to said photo-detector means.

3. The pick-up device as claimed in claim 2, wherein said cylindrical lens means is arranged to allow unimpeded passage of light between said light source means and the recording medium.

4. The pick-up device as claimed in claim 3, wherein said cylindrical lens means comprises first and second cylindrical lenses disposed between said diffraction grating means and said photo-detector means.

5. The pick-up device as claimed in claim 1, further comprising:

cylindrical lens means, disposed between said diffraciton grating means and said photo-detector means, for providing a focusing error signal to said photo-detector means.

6. The pick-up device as claimed in claim 5, wherein said cylindrical lens means comprises first and second cylindrical lenses disposed between said diffraction grating means and said first and second sensors, respectively.

7. The pick-up device as claimed in claim 1 further comprising:

cylindrical lens means, disposed between said diffracting means and said photo-detector means, for providing a focusing error signal to said photo-detector means.

8. The pick-up device as claimed in claim 7, wherein said cylindrical lens means is arranged to allow unimpeded passage of light between said light source means and the recording medium.

9. The pick-up device as claimed in claim 8, wherein said cylindrical lens means comprises first and second cylindrical lenses disposed between said diffracting means and photo-detector means.

10. A pick-up device for use in an optical information storage system which uses a recording medium, the recording medium modulating a light beam projected thereon, comprising:

light source means for directing light along a primary axis to the recording medium;

photo-detector means, disposed adjacent said light source means, for reading information from the recording medium; and diffracting means, disposed between the recording medium and said photo-detector means and having a blaze characteristic, for directing said light from said light source means along said primary axis to a desired portion of the recording medium and along a secondary direction to an undesired portion of the recording medium;

said diffracting means directing light modulated by said desired portion to said photo-detector means to provide information to said photo-detector means while passing light reflected from said undesired portion away from said photo-detector means.

11. The pick-up device as claimed in claim 8, further comprising:

cylindrical lens means, disposed between said diffracting means and said photo-detector means, for providing a focusing error signal to said photo-detector means.

12. The pick-up device as claimed in claim 11, wherein said cylindrical lens means comprises first and second cylindrical lenses disposed between said diffracting means and said first and second sensors, respectively.

* * * * *